United States Patent
Ma et al.

(10) Patent No.: US 11,131,262 B2
(45) Date of Patent: Sep. 28, 2021

(54) DEVICE FOR SIMULATING THE EVOLUTION PROCESS OF AN INTERNAL COMBUSTION ENGINE EXHAUST PARTICLE FLOW FOR REDUCING AUTOMOTIVE EMISSIONS

(71) Applicant: TSINGHUA UNIVERSITY, Beijing (CN)

(72) Inventors: Xiao Ma, Beijing (CN); Yifei Gong, Beijing (CN); Jingyu Zhang, Beijing (CN); Hongming Xu, Beijing (CN); Shijin Shuai, Beijing (CN); Yitao Shen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/174,320

(22) Filed: Feb. 11, 2021

(65) Prior Publication Data
US 2021/0231069 A1    Jul. 29, 2021

Related U.S. Application Data

(63) Continuation of application No. PCT/CN2020/085386, filed on Apr. 17, 2020.

(30) Foreign Application Priority Data

Apr. 30, 2019   (CN) .......................... 201910364957.7

(51) Int. Cl.
| | |
|---|---|
| B01D 46/02 | (2006.01) |
| F02D 41/14 | (2006.01) |
| F02D 41/02 | (2006.01) |
| F02D 41/38 | (2006.01) |
| F01N 3/021 | (2006.01) |

(Continued)

(52) U.S. Cl.
CPC ..... F02D 41/1401 (2013.01); B01D 46/0027 (2013.01); B01J 13/0095 (2013.01); (Continued)

(58) Field of Classification Search
CPC . B01D 46/0027; B01D 2279/30; F01N 3/021; G01N 1/2252; G01N 15/06
See application file for complete search history.

(56) References Cited

U.S. PATENT DOCUMENTS 3,640,626 A * 2/1972 Liskowitz .............. G01N 21/21
                                                        356/342
9,500,591 B1   11/2016 Goad et al.
(Continued)

FOREIGN PATENT DOCUMENTS

| CN | 101122556 A | 2/2008 |
|---|---|---|
| CN | 103063614 A | 4/2013 |

(Continued)

*Primary Examiner* — Lisa M Caputo
*Assistant Examiner* — Alex T Devito

(57) ABSTRACT

The invention discloses a device for simulating an evolution process of an internal combustion engine exhaust particle flow for reducing automotive emissions, and the device comprises an exhaust source; an exhaust channel, comprising a plurality of sections of cylindrical tubes with specified length that are fixedly connected; a soluble organic compound generator, used to produce soluble organic compounds; a carbon particle generator, used to produce carbon particles. The device for simulating the evolution process of an internal combustion engine exhaust particle flow for reducing automotive emissions has the advantages of simple structure and low cost; controls the mixing concentration of soot particles and soluble organic compounds through various adjustment methods to obtain a suitable mixed aerosol, so as to better simulate the exhaust particle flow of an internal combustion engine.

10 Claims, 2 Drawing Sheets

(51) Int. Cl.
  B01J 13/00   (2006.01)
  G01N 1/22   (2006.01)
  B01D 46/00   (2006.01)
  G01N 15/06   (2006.01)

(52) U.S. Cl.
  CPC .......... *F01N 3/021* (2013.01); *F02D 41/021* (2013.01); *F02D 41/38* (2013.01); *G01N 1/2252* (2013.01); *G01N 15/06* (2013.01); *B01D 2279/30* (2013.01); *F02D 2041/1437* (2013.01); *G01N 2015/0693* (2013.01)

(56) References Cited

U.S. PATENT DOCUMENTS

2003/0082825 A1    5/2003   Lee et al.
2016/0258331 A1*   9/2016   Ricci .................. F01N 9/002

FOREIGN PATENT DOCUMENTS

| | | | |
|---|---|---|---|
| CN | 103410588 | A | 11/2013 |
| CN | 104014285 | A | 9/2014 |
| CN | 105492885 | A | 4/2016 |
| CN | 105833807 | A | 8/2016 |
| CN | 107525678 | A | 12/2017 |
| CN | 105833807 | B | 7/2018 |
| CN | 108426806 | A | 8/2018 |
| CN | 108932357 | A | 12/2018 |
| CN | 110102228 | A | 8/2019 |
| KR | 20050011354 | A | 1/2005 |
| KR | 101661064 | B1 | 9/2016 |
| WO | 2012089924 | A1 | 7/2012 |

* cited by examiner

DEVICE FOR SIMULATING THE EVOLUTION PROCESS OF AN INTERNAL COMBUSTION ENGINE EXHAUST PARTICLE FLOW FOR REDUCING AUTOMOTIVE EMISSIONS

CROSS-REFERENCE TO RELATED APPLICATIONS

This application is a continuation of International Patent Application No. PCT/CN2020/085386, filed on Apr. 17, 2020, which claims the benefit of priority from Chinese Patent Application No. 201910364957.7, filed on Apr. 30, 2019. The content of the aforementioned applications, including any intervening amendments thereto, is incorporated herein by reference in its entirety.

TECHNICAL FIELD

The present invention belongs to the technical field of measurement, in particular to a device for simulating the evolution process of an internal combustion engine exhaust particle flow for reducing automotive emissions.

BACKGROUND ART

The majority of vehicles in China are powered by internal combustion engines. For different purposes, internal combustion engine vehicles are divided into gasoline-powered vehicles and diesel-powered vehicles. The internal combustion engine has always been the main power of vehicles for its high power, strong continuous working capability, convenience in movement and fuel replenishment.

It is commonly believed in the industry that the internal combustion engine will remain its position as the main power of vehicles in the next few decades. As the environmental protection measures become increasingly rigorous, the emission pollution caused by traditional internal combustion engine vehicles has attracted more and more attention, especially the particulate matter emission from internal combustion engine vehicles, which is deemed as one of the main causes of urban "smog". The particulate matter exhausted by internal combustion engine vehicles contains not only solid soot, but also a large number of volatile organic compounds (VOC) and semi-volatile organic compounds (SVOC), though with small average particle size, which has been proven to be more harmful to the environment and the human body. However, new regulations on emissions not only limit the quality of particulates but also limit the particulate number (PN), which presents a severe challenge to the development of internal combustion engines.

After the soot formed in the cylinder of the internal combustion engine leaves the combustion chamber, it will evolve into particulate matter during exhausting. For diesel engines, the evolution process mainly develops in post-processing devices such as an oxidation catalyst, a selective catalytic reducer, and a particulate filter. There are a plurality of volatile components in gasoline engine emissions, which may lead to more complexed evolution process of the quality, quantity, composition and particle size distribution of the particulate matter in the exhaust system.

Till now, people has not have a comprehensive understanding of the main components and the effects of exhaust aerosols, including motor vehicles. For the treatment of particulate matters in diesel exhaust, a diesel particulate filter (DPF) is recognized as the most effective particulate filtering device (physically capture the diesel particulates, with an efficiency up to 95%). It is also one of the technologies having the best commercial prospect in the prior filtering technologies. For gasoline engines, similarly, there is a gasoline engine particulate filter (GPF). According to the research, GPF can effectively reduce PN emissions, especially under low-speed, high-load operating conditions, GPF is able to reduce original PN emissions by two orders of magnitude.

At present, it is a common practice in the laboratory research of GPF/DPF to use carbon black aerosol to simulate the exhaust particle flow of an internal combustion engine because it avoids the consumption of funds, personnel and benches caused by carrying out experiments directly on internal combustion engine.

Besides, the particulate matter produced by internal combustion engines also a large number of volatile organic compounds (VOC) and semi-volatile organic compounds (SVOC), and it is not appropriate to use the carbon black aerosol alone to simulate the exhaust particle flow of internal combustion engines. Therefore, it is necessary to use a mixture of gasoline/diesel oil and lubricating oil to simulate the soluble organic compounds in the exhaust particle flow of internal combustion engines. Simultaneously, a flame burner can be used as the exhaust source to simulate the actual exhaust gas environment of internal combustion engines.

Concerning generation of carbon black aerosol in internal combustion engines, the RBG series dust aerosol generators developed by German PALAS Company use a rotating electric brush to uniformly remove a certain amount of dust to generate aerosol, and the aerosol has stable concentration and can be effectively used to generate a black carbon aerosol; however, due to the size and quality of the particles, when the particles are directly used with the gas to form aerosols they are easily precipitated. Therefore, it is difficult to achieve good particle suspension effect to generate the particulate aerosols using a dust aerosol generator.

TDA series aerosol generators developed by US ATI Company atomizes the liquid with a Laskin nozzle to generate aerosol, and the aerosol is stable in concentration but supports only one method for concentration adjustment (only adjusting the air dilution ratio).

In the existing relevant Chinese patents, adjustment is made based on the principle of particles generation and diversion dilution by rotating, and the basic principle is similar to that of the RBG series dust aerosol generator of PALAS Company, Germany; however, due to the size and quality of the particles, when the particles are directly used with the gas to form aerosols they are easily precipitated. Therefore, it is difficult to achieve good particle suspension effect to generate the particulate aerosols using a dust aerosol generator.

DETAILED DESCRIPTIONS OF THE INVENTION

The present invention provides a device for simulating the evolution process of an internal combustion engine exhaust particle flow for reducing automotive emissions, which is intends to solve at least one problem in the prior art.

One a first aspect, the present invention provides a device for simulating the evolution process of an internal combustion engine exhaust particle flow for reducing automotive emissions, comprising:

An exhaust source, used to produce high temperature exhaust gas;

An exhaust channel, comprising a plurality of sections of cylindrical tubes of predetermined length, and the plurality of sections of cylindrical tubes with specified length that are fixedly connected; wherein one end of the exhaust channel is close to the exhaust source, and the other end thereof is away from the exhaust source;

A soluble organic compound generator, used to generate soluble organic compounds; wherein the soluble organic compound generator comprises a fuel injector, an injector control unit, an injector adapter, and a tapered tube; a lower surface of the injector adapter is welded with a small end of the tapered tube concentrically, and a nozzle of the fuel injector is located in the center of the tapered tube; a large end of the tapered tube is welded to the end of the exhaust channel that is close to the exhaust source through a cylindrical tube, and with a first distance from the top of the exhaust channel; the oil in the fuel injector is a mixed liquid formed by a lubricating oil and gasoline or diesel according to a certain proportion;

A carbon particle generator, used to generate carbon particles; the carbon particle generator comprises a smoke chamber, an ultrasonic atomizer, a mixing motor, a support plate, a jet vacuum pump, and a high-pressure nitrogen gas bottle; wherein the ultrasonic atomizer is arranged in the bottom of the smoke chamber; a rotating shaft of the mixing motor is supported by the support plate; the support plate is arranged above the level of the smoke chamber; a hole is arranged on the cover of the smoke chamber and is connected to a suction port at the lower part of the jet vacuum pump; an inlet of the jet vacuum pump is connected to the high-pressure nitrogen gas bottle; an outlet of the jet vacuum pump is connected to the end of the exhaust channel close to the exhaust source through a metal transfer pipe, which has a second distance from the top of the exhaust channel.

The heat source is placed under the smoke chamber and used to heat the smoke chamber;

An outer wall of the metal transfer pipe is wrapped with a heating cable, and the heating cable is peripherally wrapped with insulating asbestos; a probe connected to a thermocouple of a temperature controller is arranged at the end of the heating cable for monitoring the temperature at the end of the metal transfer pipe.

A sampling hole and a temperature measurement point are arranged at the downstream port position of each section of the cylindrical tube of the exhaust channel; and the sampling hole and the temperature measuring point are used for sampling and temperature measurement of particles along the way;

A laser extinction test system, comprising a quartz glass tube connected to the end of the exhaust channel, and a probe for collecting a scattered light; the system is used to compare the light intensity before and after the laser crosses through the exhaust gas, and calculate the soot volume fraction in an exhaust pipe according to the following formula below $C_v$:

$$C_v = \alpha \frac{\lambda}{6\pi L K(\chi)} \ln\left(\frac{I}{I_0}\right)$$

Wherein, $\alpha$ is the correction coefficient; $\lambda$ is a wavelength of the laser; L is the optical path length; $\chi$ the complex refractive index of soot; $K(\chi)$ is the function of a complex refractive index $$K(\chi) = \text{Im}\left(\frac{m^2-1}{m^2+2}\right);$$

$I_0$ is the intensity of an incident light; I is the intensity of an output light;

A feedback control system, which is used to compare the concentration of soot in the exhaust pipe with a preset threshold, and generate a control signal according to the comparison result, and feed the control signal back to a nitrogen control unit of the nitrogen source and the injector control unit so as to change the gas supply pressure of the nitrogen source and the pulse width of the fuel injector.

Optionally, the exhaust source is a flame burner.

Optionally, the exhaust channel comprises 6 sections of cylindrical tubes.

Optionally, the cylindrical tube is 500 mm long.

Optionally, all sections of cylindrical tubes are connected by flanges and bolts.

Optionally, a large end of the tapered tube is welded to the end of the exhaust channel that is close to the exhaust source through a circular tube, and 100 mm from the top of the exhaust channel;

Optionally, an outlet of the jet vacuum pump is connected to the end of the exhaust channel close to the exhaust source through a metal transfer pipe, and 400 mm from the top of the exhaust channel.

Optionally, the smoke chamber is a mixture of ϕ 30 nm nano-carbon particles with water.

Optionally, the heat source is used for heating the liquid in the smoke chamber up to 80° C.

Optionally, the device for simulating the evolution process of an internal combustion engine exhaust particle flow for reducing automotive emissions further comprises a particulate filter system, which comprises a particulate filter connected to the tail end of the quartz glass tube and is used to capture particulates in the exhaust gas.

The innovative points of the embodiment of the present invention are described as below:

1. The device for simulating the evolution process of an internal combustion engine exhaust particle flow for reducing automotive emissions has the advantages of simple structure and low cost; this is one of the innovative points of the present invention.

2. The device controls the mixing concentration of soot particles and soluble organic compounds through various adjustment methods to obtain a suitable mixed aerosol, so as to better simulate the exhaust particle flow of an internal combustion engine; and master the evolution law of particulate matters in internal combustion engine by various testing methods, this is one of the innovative points of the present invention.

3. The device introduces a laser extinction test system to measure the soot particle concentration (volume fraction) in the exhaust channel, the system test device is simple, as it only needs a laser and a photoelectric diode, the cost is lower, the data obtained is reliable, and it can get the soot volume fraction in the space; this is one of the innovative points of the present invention.

DESCRIPTION OF THE ATTACHED DRAWINGS

In order to better clarify the embodiments of the present invention and the technical solutions in the prior art, the attached drawings to be used in the description of the embodiments or the prior art will be simply introduced. Obviously, the attached drawings described below are only some embodiments of the present invention, and ordinary technicians in the art can also obtain other drawings the drawings without creative work.

DETAILED DESCRIPTION OF EMBODIMENTS

Combining the drawings and the detailed description, the technical solutions in the embodiment of the present invention are clearly and completely described as follows. Of course, the embodiments described only represent a part of the embodiments of the present invention, but not all of them. Based on embodiments of the present invention, all other embodiments obtained by ordinary technicians in the art without any creative work should fall within the protection scope of the present invention.

It should be noted that, the terms "comprising" and "having" in embodiments and attached drawings of the present invention and any variation thereof are intended to cover non-exclusive inclusions. For example, including a process, a method, a system, a product, or a device of a series of steps or units but not limited to the listed steps or units, but optionally including any unlisted steps or units, or optionally also including other steps or units fixed to the processes, methods, products or equipment.

The present invention discloses a device for simulating the evolution process of an internal combustion engine exhaust particle flow for reducing automotive emissions, which will be described in details below.

Figure 1:
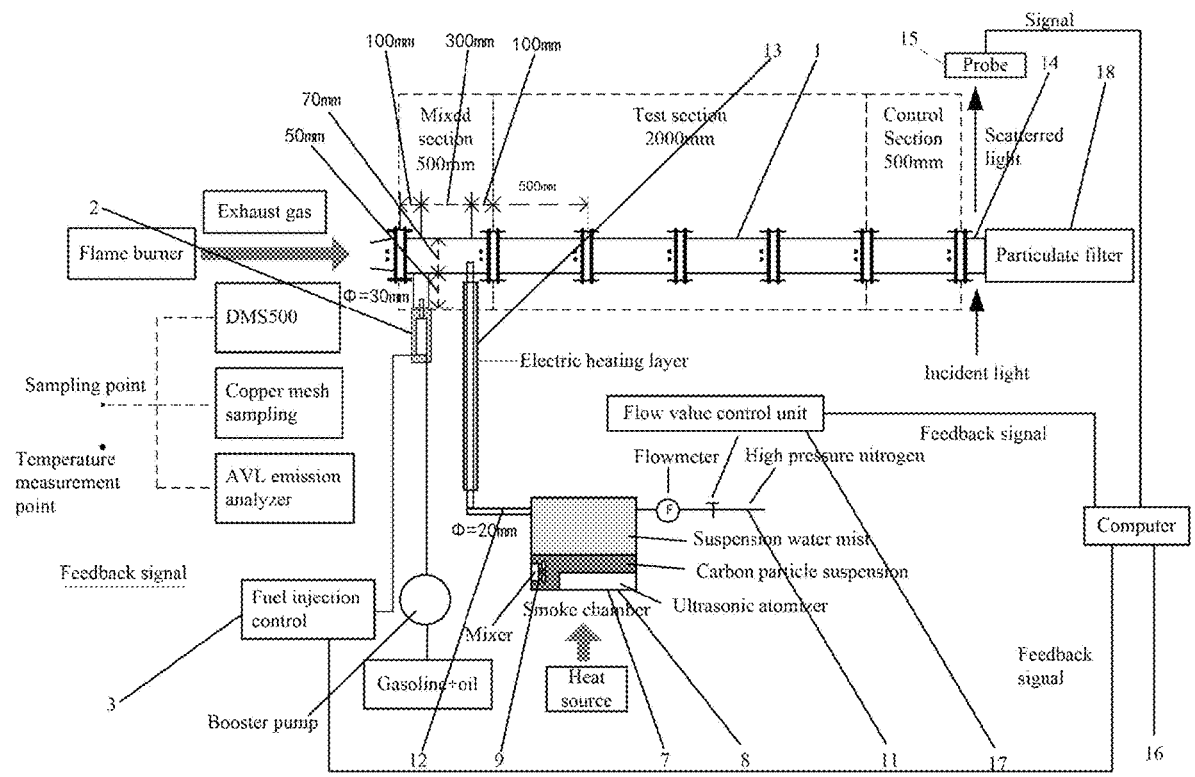
FIG. 1 depicts a structural diagram of a device for simulating the evolution process of an internal combustion engine exhaust particle flow for reducing automotive emissions according to an embodiment of the present invention.

FIG. 1 depicts a structural diagram of a device for simulating the evolution process of an internal combustion engine exhaust particle flow for reducing automotive emissions according to an embodiment of the present invention;

As shown in FIG. 1, a device for simulating the evolution process of an internal combustion engine exhaust particle flow for reducing automotive emissions, comprises an exhaust source, an exhaust channel for simulating the evolution process of particulates, a soluble organic compound generator and a carbon particle generator.

A flame burner can be used as an exhaust source to simulate a high temperature exhaust flow generated by an internal combustion engine.

The exhaust channel 1 is formed by 6 sections of cylindrical tubes, with each section of cylindrical tube being 500 mm long; and all sections of cylindrical tubes are connected by flanges and bolts.

Figure 2:
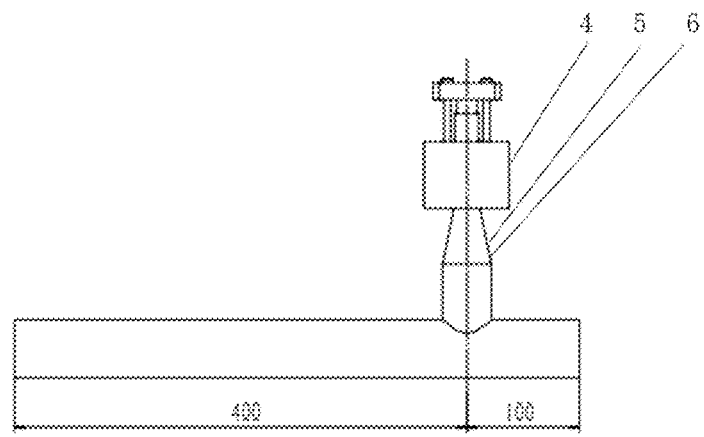
FIG. 2 depicts a positional relation between a fuel injector base and a first section of cylindrical tube in a soluble organic compound generator according to an embodiment of the present invention.

FIG. 2 depicts a positional relation between a fuel injector base and a first section of cylindrical tube in a soluble organic compound generator according to an embodiment of the present invention; As shown in FIG. 2, an oil mist generator is welded on a first section of cylindrical tube (also called fixed section) in the exhaust channel. A soluble organic compound generator comprises a fuel injector 2, an injector control unit 3, an injector adapter 4, and a tapered tube 5. A lower surface of the injector adapter 4 is concentrically welded with a small end of the tapered tube 5, a nozzle of the fuel injector is located in the center; and a large end of the tapered tube is welded to a first section of cylindrical tube in the channel through a cylindrical tube 6. The cylindrical tube 6 has a 100 mm distance from upstream of the first section of cylindrical tube.

Generation of volatile organic compounds: in a soluble organic compound generator, the lubricating oil and gasoline/diesel oil are mixed respectively in the proportion of 0.5%, 1.0% and 1.5%, to facilitate simulation of volatile organic compounds in an internal combustion engine. After the fuel is sprayed out of the fuel injector 2, it enters into the high-temperature environment of burner exhausts, which will accelerate the evaporation process; the oil mist is evaporated and atomized, and then mixed with the burner exhausts in the tapered tube 5 and the cylindrical tube 6 welded to it, the volatile organic compounds evaporated from the oil mist flows backward with the exhaust gas along the channel. The fuel injector 2 is a PSA fuel injector.

Generator of carbon particles: carbon particles are generated by the smoke chamber 7; after mixing a certain amount of nano-carbon particles, the diameter of the carbon particle becomes 30 mm. Place the mixture of carbon particles and water into the smoke chamber 7, and fill up ⅖ of the volume of the smoke chamber 7, place a ultrasonic atomizer 8 in the center at the bottom of the smoke chamber 7, apply a ultrasonic directional pressure to make the liquid surface bulged, thus to atomize the liquid into small-molecule gas mist. The water mist carries carbon particles to form an aerosol of carbon particles, which fills the entire space of the smoke chamber 7.

Figure 3:
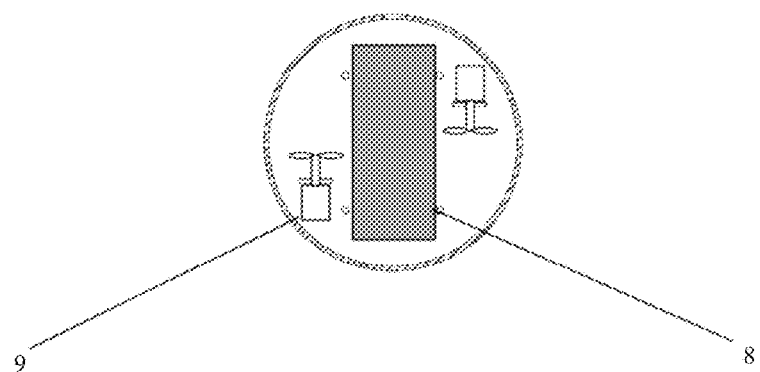
FIG. 3 depicts a top view of a smoke chamber of a carbon particle generator according to an embodiment of the present invention.

FIG. 3 depicts a top view of a smoke chamber in a carbon particle generator according to an embodiment of the present invention. As shown in FIG. 3; a mixing motor 9 is respectively arranged on the liquid surface on both sides of the ultrasonic atomizer 8, a rotating shaft of the mixing motor 9 is supported on a acrylic board, and the acrylic support board is placed above the liquid surface. After powering on the mixing motor 9, it will quickly mix the liquid surface to assist the atomization effect of the ultrasonic atomizer 8.

Simultaneously, use a heat source to heat the bottom of the smoke chamber 7 to make the water temperature reach about 80° C.; use a probe thermocouple to measure the water temperature and fill the carbon particle saturated aerosols that are evenly distributed above the liquid level of the smoke chamber 7. Introduce the power cords of the mixing motor 9 and the ultrasonic atomizer 8 through a hole drilled on the cover of the smoke chamber 7.

Figure 4:
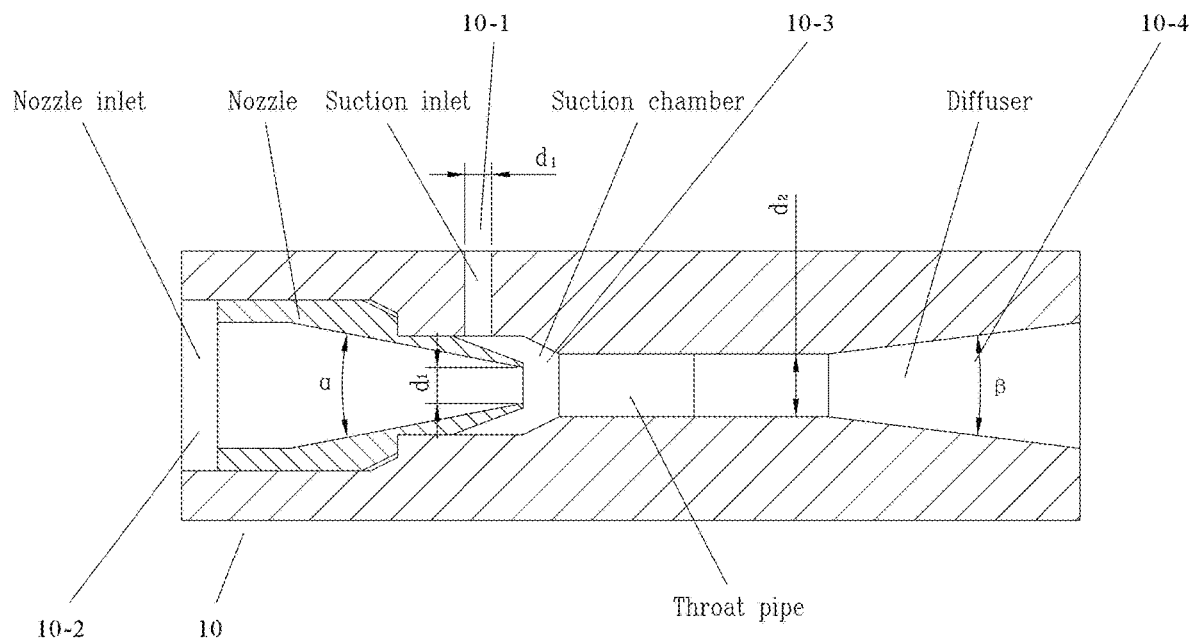
FIG. 4 depicts a cross-section diagram of a jet vacuum pump according to an embodiment of the present invention.

FIG. 4 depicts a cross-section diagram of a jet vacuum pump according to an embodiment of the present invention. As shown in FIG. 4, a hole is arranged on the cover of the smoke chamber 7 and is connected to a suction port 10-1 at the lower part of the jet vacuum pump 10; an inlet 10-2 of the jet vacuum pump 10 is connected to the high-pressure nitrogen gas bottle 11; when the nitrogen flows by, under the vacuum pumping effect of throttling, the carbon particle aerosol is pumped out of the smoke chamber land is further atomized, and then it flows by a vacuum chamber 10-3 of the jet vacuum pump 10 and exists from the outlet 10-4, and finally enters into the metal transport pipe 12.

Heating of carbon particles aerosol: the carbon particle aerosol enters into the metal transport pipe 12, an outer wall of the metal transfer pipe 12 is wrapped with a heating cable 13, and the heating cable 13 is peripherally wrapped with insulating asbestos; The heating cable 13 is used to heat the carbon particle aerosol, dry the water mist up and turn it into water vapor, so as to prevent liquid water in the tail gas tube 1 from evaporating and absorbing heat, thus to change the temperature environment in the exhaust pipe. A thermocouple probe is arranged at the end of the heating cable 13 and the thermocouple is connected to a temperature controller to monitor the temperature at the end of the metal transport pipe, which is designed as 300° C. The metal pipe 12 is connected to the first section of cylindrical tube in the channel through an adapter.

Sampling and temperature measurement: the first section of the cylindrical tube may be called as a mixing section and it is mainly used to vaporize and atomize the oil mist and mix with the burner exhausts. The 2nd, 3rd, 4th and 5th sections of cylindrical tubes are collectively called as test sections and are used for measuring the temperature of exhausts along and sampling the particulate matters along. The 6th section of cylindrical tube is called as a control section, used to measure the exhaust flow. A sampling hole and a temperature measurement point are arranged at the lower port of each section of cylindrical tube. Sampling is conducted by a copper mesh. The particle size distribution measurement equipment CAMBUSTION DMS500 is used to measure the particle size of particulate matters, and an emission analyzer is used to measure other volatile organic compounds.

Laser extinction test system: the system is used to measure the soot concentration (volume fraction) in the exhaust gas. A section of quartz glass tube 14 is connected at the end of the cylindrical tube in the exhaust channel so as to conduct a laser extinction test through incident light and scattered light. The scattered light produced by the exhaust aerosol is collected by an extinction system probe 15. The soot concentration (volume fraction) in the exhaust pipe can be obtained by comparing the light intensity before and after the laser passes through the exhaust gas (aerosol containing soot).

The laser extinction test system is used to measure the soot concentration (volume fraction) in the exhaust gas. As with strong light scattering and absorption of soot particles, the energy detected by a receiver decreases when the light beam produced by the laser passes through the exhaust gas (aerosol containing soot). Because the soot has much stronger ability to absorb light than to scatter light, the light intensity I after passing through the aerosol can be obtained by the Lambert-Beer formula below:

$$I = I_0 \exp\left[-\int_0^L E dx\right]$$

Where, $I_0$ is the incident light intensity; L is the optical path length; E is the extinction coefficient; the volume fraction of soot is obtained based on the light scattering theory $C_v$:

$$C_v = \alpha \frac{\lambda}{6\pi L K(\chi)} \ln\left(\frac{I}{I_0}\right)$$

Where, $\alpha$ is the correction coefficient, $\lambda$ the wavelength of a laser, $\chi$ is the complex refractive index of soot, and $K(\chi)$ is the function of the complex refractive index $$K(\chi) = \operatorname{Im}\left(\frac{m^2 - 1}{m^2 + 2}\right).$$

The soot concentration (volume fraction) in the exhaust pipe can be obtained by comparing the light intensity before and after the laser passes through the exhaust gas (aerosol containing soot).

The device introduces the system to measure the soot particle concentration (volume fraction) in the exhaust channel, the system test device is simple, as it only needs a laser and a photoelectric diode, the cost is lower, the data obtained is reliable, and it can get the soot volume fraction in the space. Hence, the system is widely applied for testing soot concentration.

A section of quartz glass tube is connected at the end of the cylindrical tube in the exhaust channel so as to conduct a laser extinction test through incident light and scattered light. The scattered light produced by the exhaust aerosol is collected by an extinction system probe.

Feedback control system: transfer the signal of the soot volume fraction in the exhaust pipe obtained by the laser extinction system to a computer 16, after judgment the computer 16 feeds the control signal back to the flow valve control unit 17 and the fuel injection control unit 3 to change the nitrogen supply pressure and the injection pulse width, so as to change the mass flow rate of carbon particles and the number of volatile organic compounds, thereby obtaining a mixed aerosol with different soot concentrations and soluble organic compound concentrations.

Particulate filter system: a commercial particulate filter 18 (DPF or GPF) is configured at the downstream interface of the quartz glass tube 14 to capture particulates in the exhausts, thus to prevent it from polluting the atmosphere.

The device for simulating the evolution process of an internal combustion engine exhaust particle flow for reducing automotive emissions of the present inventions has the advantages of simple structure and low cost; controls the mixing concentration of soot particles and soluble organic compounds through various adjustment methods to obtain a suitable mixed aerosol, so as to better simulate the exhaust particle flow of an internal combustion engine; and master the evolution law of particulate matters in internal combustion engine by various testing methods.

It is understood by the ordinary technicians in the art: the attached drawings are only schematic diagrams of an embodiment, and the module or flow chart in the attached drawings is not necessarily needed for implementation of the present invention.

It is understood by the ordinary technicians in the art: the modules in the device of the embodiment may be distributed in the device of the embodiment as described in the embodiment, or they may be changed accordingly and distributed in one or more devices other than that of the embodiment. The modules of the above embodiment may be combined into one module or further divided into a plurality of sub-modules.

The last point to be noted is that: the above embodiment is only used to describe the technical solution of the present invention, but does not constitute any restriction on the solution; although the detailed description of the present invention is made by referring to the aforementioned embodiments, the ordinary technical person in the art must understand that he may still have the right to modify the technical solutions as described in the aforementioned embodiments, or substitute some of the technical features thereof with its equivalent; while such modifications or substitutes do not make the essence of the corresponding technical solution separated from the spirit and scope of the embodiment of the present invention.

What is claimed is:

1. A device for simulating an evolution process of an internal combustion engine exhaust particle flow for reducing automotive emissions, which is characterized by comprising:
   an exhaust source, used to produce high temperature exhaust gas;
   an exhaust channel, comprising a plurality of sections of cylindrical tubes of predetermined length, and the plurality of sections of cylindrical tubes with specified length that are fixedly connected; wherein one end of the exhaust channel is close to the exhaust source, and the other end thereof is away from the exhaust source;
   a soluble organic compound generator, used to generate soluble organic compounds; wherein the soluble organic compound generator comprises a fuel injector, an injector control unit, an injector adapter, and a tapered tube; a lower surface of the injector adapter is welded with a small end of the tapered tube concentrically, and a nozzle of the fuel injector is located in the center of the tapered tube; a large end of the tapered tube is welded to the end of the exhaust channel that is close to the exhaust source through a cylindrical tube, and with a first distance from the top of the exhaust channel; the fuel injector is configured to accommodate a mixed liquid formed by a lubricating oil and gasoline or diesel according to a certain proportion;
   a carbon particle generator, used to generate carbon particles; wherein the carbon particle generator comprises a smoke chamber, an ultrasonic atomizer, a mixing motor, a support plate, a jet vacuum pump, and a high-pressure nitrogen gas bottle; wherein the ultrasonic atomizer is arranged in the bottom of the smoke chamber; a rotating shaft of the mixing motor is supported by the support plate; the support plate is arranged above the level of the smoke chamber; a hole is arranged on the cover of the smoke chamber and is connected to a suction port at the lower part of the jet vacuum pump; an inlet of the jet vacuum pump is connected to the high-pressure nitrogen gas bottle; an outlet of the jet vacuum pump is connected to the end of the exhaust channel close to the exhaust source through a metal transfer pipe, which has a second distance from the top of the exhaust channel;
   wherein the device further comprises a heat source placed under the smoke chamber and used to heat the smoke chamber;
   an outer wall of the metal transfer pipe is wrapped with a heating cable, and the heating cable is peripherally wrapped with insulating asbestos; a probe connected to a thermocouple of a temperature controller is arranged at the end of the heating cable for monitoring the temperature at the end of the metal transfer pipe;
   a sampling hole and a temperature measurement point are arranged at the downstream port position of each section of the cylindrical tube of the exhaust channel; and the sampling hole and the temperature measuring point are used for sampling and temperature measurement of particles along the way;
   a laser extinction test system, comprising a quartz glass tube connected to the end of the exhaust channel, and a probe for collecting a scattered light; the system is used to compare the light intensity before and after the laser crosses through the exhaust gas, and calculate the soot volume fraction $C_v$ in an exhaust pipe according to the following formula below:

$$C_v = \alpha \frac{\lambda}{6\pi L K(\chi)} \ln\left(\frac{I}{I_0}\right)$$

wherein, $\alpha$ is the correction coefficient; $\lambda$ is a wavelength of the laser; L is the optical path length; $\chi$ the complex refractive index of soot; $K(\chi)$ is the function of a complex refractive index $$K(\chi) = \operatorname{Im}\left(\frac{m^2 - 1}{m^2 + 2}\right);$$

$I_0$ is the intensity of an incident light; I is the intensity of an output light;
   a feedback control system, which is used to compare the concentration of soot in the exhaust pipe with a preset threshold, and generate a control signal according to the comparison result, and feed the control signal back to a nitrogen control unit of the nitrogen source and the injector control unit so as to change the gas supply pressure of the nitrogen source and the pulse width of the fuel injector.

2. The device for simulating the evolution process of an internal combustion engine exhaust particle flow for reducing automotive emissions of claim 1, the device is characterized in that the exhaust source is a flame burner.

3. The device for simulating the evolution process of an internal combustion engine exhaust particle flow for reducing automotive emissions of claim 1, the device is characterized in that the exhaust channel comprises 6 sections of cylindrical tubes.

4. The device for simulating the evolution process of an internal combustion engine exhaust particle flow for reducing automotive emissions of claim 3, the device is characterized in that the cylindrical tube is 500 mm long.

5. The device for simulating the evolution process of an internal combustion engine exhaust particle flow for reducing automotive emissions of claim 4, the device is characterized in that all sections of cylindrical tubes are connected by flanges and bolts.

6. The device for simulating the evolution process of an internal combustion engine exhaust particle flow for reducing automotive emissions of claim 5, the device is characterized in that a large end of the tapered tube is welded to the end of the exhaust channel that is close to the exhaust source through a cylindrical tube, and 100 mm from the top of the exhaust channel.

7. The device for simulating the evolution process of an internal combustion engine exhaust particle flow for reducing automotive emissions of claim 6, the device is characterized in that an outlet of the jet vacuum pump is connected to the end of the exhaust channel close to the exhaust source through a metal transfer pipe, and 400 mm from the top of the exhaust channel.

8. The device for simulating the evolution process of an internal combustion engine exhaust particle flow for reducing automotive emissions of claim 1, the device is characterized in that the liquid in the smoke chamber is a mixture of nano-carbon particles with water, wherein the nano-carbon particles have a diameter of 30 nm.

9. The device for simulating the evolution process of an internal combustion engine exhaust particle flow for reducing automotive emissions of claim 1, the device is characterized in that the heat source is used for heating the liquid in the smoke chamber up to 80° C.

10. The device for simulating the evolution process of an internal combustion engine exhaust particle flow for reducing automotive emissions of claim 1, the device is characterized in that it further comprises a particulate filter system, which includes a particulate filter connected to the tail end of the quartz glass tube and is used to capture particulates in the exhaust gas.

\* \* \* \* \*